Patented Apr. 27, 1937

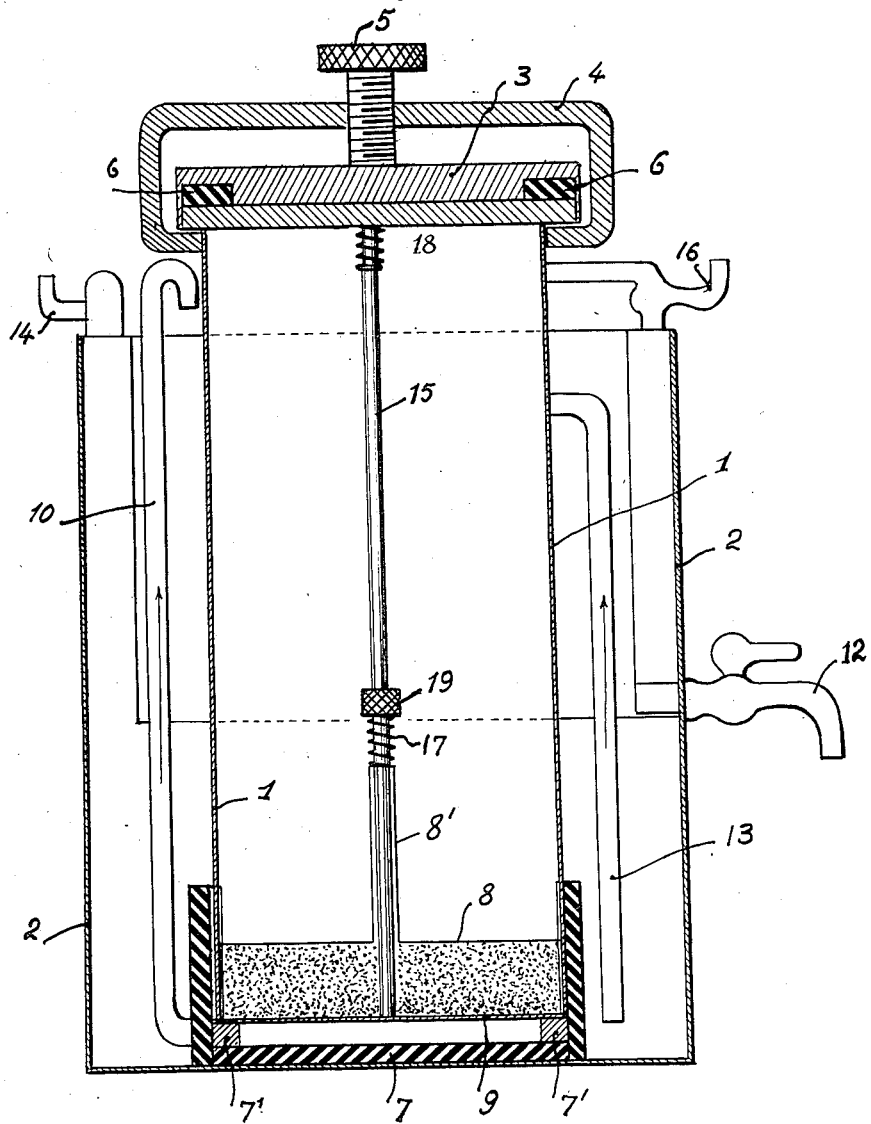

2,078,561

UNITED STATES PATENT OFFICE 2,078,561

APPARATUS FOR MAKING INFUSIONS

Eubole Cavalletti, Milan, Italy

Application May 6, 1936, Serial No. 78,076
In Italy May 13, 1935

3 Claims. (Cl. 53—3)

The subject matter of the present invention is an apparatus for making infusions, such as coffee, specially for each consumer or for a number of simultaneous consumers, the said apparatus comprising two vessels thermally insulated from each other. The essential feature of the invention resides in the fact that the apparatus comprises two coaxial vessels, the one being internal in which the substance in the form of powder—e. g., coffee, of which the infusion is to be made, is placed between two filters, and the other being external, in which the water or other extracting liquid is brought to the requisite temperature and pressure to cause it to rise by means of a tube, which dips into the bottom part of the external vessel and is connected with the upper part of the internal vessel, and to discharge into the lower part where the said substance is situated.

The coffee, or other infusion, after filtration, is forced by the pressure to ascend in another tube starting from the lower part of the internal vessel, and it is discharged through this tube into a reservoir provided in the annular chamber between the internal vessel and the external vessel, or directly into the receptacle or cup in which the coffee or other infusion is consumed.

The accompanying drawing, given by way of example, shows in vertical section a small apparatus according to the invention for making coffee specially for each consumer or for a number of simultaneous consumers.

As can be seen from the drawing, the said apparatus comprises two vessels, an internal vessel 1 and an external vessel 2 which is coaxial with the vessel 1. The internal vessel has a cover 3, on which there is arranged a stirrup 4, for the purpose of exercising a pressure by means of screw 5 on the cover itself, in order to obtain a hermetic closure. If desired, there may also be fitted a rubber washer 6 between the cover and the upper edge of the vessel 1. Over the bottom 7 of the external vessel 2, which bottom is covered with insulating material, there are arranged the two filters 8 and 9 in which is placed the coffee in powder form, the filter 9 resting on an annular support 7', which is arranged on the bottom 7, and the filter 8 being threaded on the spindle 15 with which the filter 9 is fitted. The water is placed in the vessel 2. When this water has been brought to the requisite temperature and pressure, it rises in the tube 13, which dips into the bottom part of the vessel 2 and which is connected to the upper part of the internal vessel 1, into which the water is discharged and falls and passes through the filter 8 into the coffee in powder form. The coffee, filtered through the filter 9, is forced to rise, owing to the effect of the pressure, in the tube 10, from which it is discharged into the reservoir 11, which in its turn is provided with a discharge cock 12, or directly into the receptacle or cup in which the coffee is consumed. The reservoir is also suitable if the coffee to be prepared is to serve for a number of people, in order to have a coffee of uniform strength.

A cock or valve 14 is provided to one side of the cover of the external vessel, for the discharge of the steam, and on the other side there is a two-way valve 16, for the discharge of the steam and water.

A spring 18 is threaded on the end of the spindle 15 in order to press the filter 9 against the annular support 7' provided on the bottom 7, and a pressure screw 19 with spring 17 are provided at the upper end of the tubular spindle 8' of the filter 8, in which the spindle 15 is threaded, so as to be able to exert an adjustable pressure on the filter 8 against the powdered coffee. If necessary the filter 9 may be formed by the bottom of the internal boiler 1, which may, if desired, be provided with small holes. The provision of the reservoir 11 is not essential, and if desired the tube 10 may be arranged outside the vessel 2; in such a case, it is advisable that it be covered with a heat-insulating material.

What I claim is:—

1. An apparatus for making infusions, comprising two coaxial vessels which are thermally insulated from each other and are arranged one within the other, the external one of said vessels being intended to contain the extracting liquid, two filters arranged in the internal one of said vessels and adapted to hold between them the substance of which an infusion is to be made, a tube dipping into the bottom part of the external one of said vessels and communicating with the upper part of the internal one of said vessels, means for causing to be exerted on the extracting liquid, when said extracting liquid is heated to the required temperature, sufficient pressure to cause said extracting liquid to pass from the external one of said vessels, through said tube and into the internal one of said vessels, a reservoir in the space between said vessels, and a tube extending from between the bottom one of said filters and the bottom of the external one of said vessels and adapted to discharge the infusion into said reservoir.

2. An apparatus for making infusions, comprising two coaxial vessels which are thermally insulated from each other and are arranged one within the other, the external one of said vessels being intended to contain the extracting liquid, two filters arranged in the internal one of said vessels and adapted to hold between them the substance of which an infusion is to be made, adjustable means acting on one of said filters for pressing it into contact with said substance, spring means on the other of said filters for holding it firmly in position, a tube dipping into the bottom part of the external one of said vessels and communicating with the upper part of the internal one of said vessels, means for causing to be exerted on the extracting liquid, when said extracting liquid is heated to the required temperature, sufficient pressure to cause said extracting liquid to pass from the external one of said vessels, through said tube and into the internal one of said vessels, and a tube extending from between the bottom one of said filters and the bottom of the external one of said vessels and adapted to discharge the infusion.

3. An apparatus for making infusions, comprising two coaxial vessels which are thermally insulated from each other and are arranged one within the other, the external one of said vessels being intended to contain the extracting liquid, two filters arranged in the internal one of said vessels and adapted to hold between them the substance of which an infusion is to be made, an annular support on which one of said filters is seated, spring means for holding said filter on said support, adjustable means for pressing said other filter towards said first filter, a tube dipping into the bottom part of the external one of said vessels and communicating with the upper part of the internal one of said vessels, means for causing to be exerted on the extracting liquid, when said extracting liquid is heated to the required temperature, sufficient pressure to cause said extracting liquid to pass from the external one of said vessels, through said tube and into the internal one of said vessels, and a tube extending from between the bottom one of said filters and the bottom of the external one of said vessels and adapted to discharge the infusion into the receptacle in which the infusion is consumed.

EUBOLE CAVALLETTI.